Sept. 4, 1962 A. L. MILLER ET AL 3,052,580
LAMINATED ARTICLES OF MANUFACTURE
Filed May 3, 1957
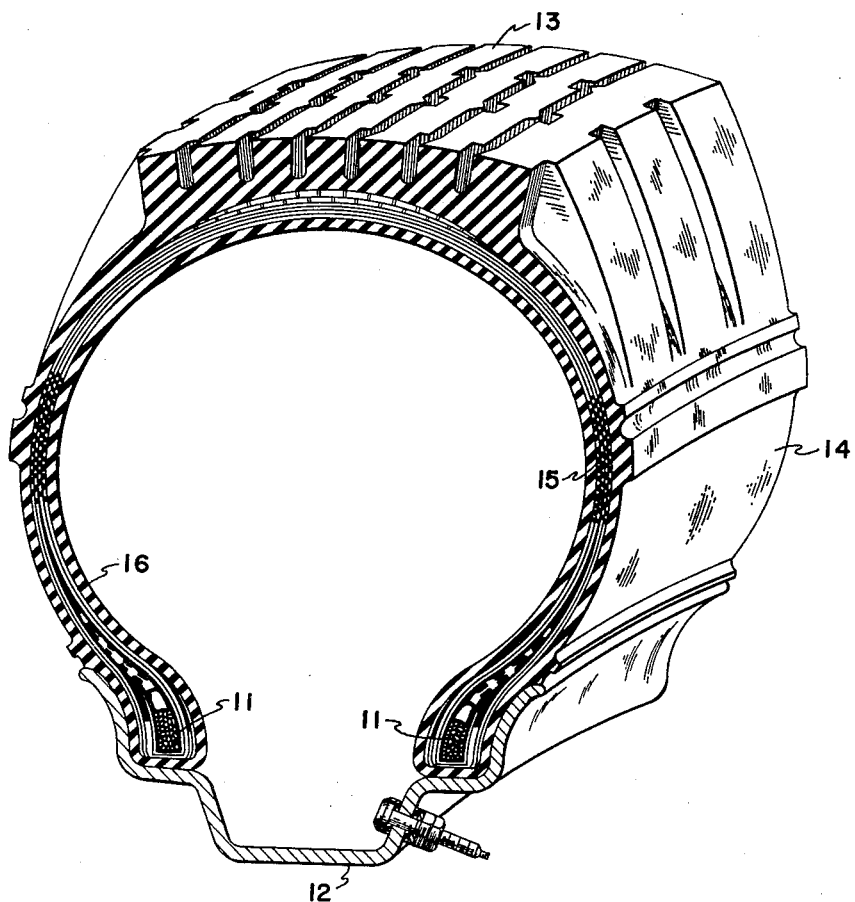
Alfred L. Miller
Francis P. Baldwin    Inventors
Samuel B. Robison
By *H.H. Smyers*    Attorney 3,052,580
Patented Sept. 4, 1962

3,052,580
LAMINATED ARTICLES OF MANUFACTURE
Alfred L. Miller, Cranford, Francis P. Baldwin, Colonia, and Samuel B. Robison, Roselle, N.J., assignors to Esso Research and Engineering Company, a corporation of Delaware
Filed May 3, 1957, Ser. No. 656,960
20 Claims. (Cl. 154—52)

This invention relates to coating compositions for natural or synthetic fibrous materials, such as cotton, rayon, nylon, etc., to improve the adhesion thereof to rubber such as natural rubber or especially synthetic rubber such as GR–S rubber, Buna-N rubber, and preferably butyl rubber.

More particularly, the present invention relates to coating fibers, filaments, or especially tire cords with a first layer of a phenolic-aldehyde resin-containing polyhaloalkadiene rubber latex, drying and then coating with a second layer of a brominated butyl rubber cement, drying and then incorporating the thus treated fibers, filaments or cords into a rubber matrix to form a composite such as the carcass plies in tires.

The invention will be best understood from the following description when read in connection with the accompanying drawing in which the single FIGURE is a sectional view in perspective of a pneumatic tubeless tire manufactured in accordance with the present invention.

Heretofore, cellulosic and synthetic fibers such as rayon, regenerated cellulose and nylon threads, cords, or filaments have adhered very poorly to rubber and to compounded rubber stocks (especially containing butyl rubber) when they were united and the rubber stock subsequently cured according to any known process of producing adhesion between rubber and fibers. This poor adhesion, especially of synthetic threads, cords, and fabrics to synthetic rubber such as butyl rubber has constituted a very serious obstacle to more extensive use of butyl rubber in the manufacture of automobile tires, reinforced rubber belts and similar products consisting of alternate plies of rubber and cords. Such products are required to adhere very strongly for long periods of time under drastic conditions of high temperature, constant flexing, bending, shock, etc. For example, if nylon cord is pressed into butyl rubber or a butyl rubber stock and the composite vulcanized, it will be observed that the nylon cord may be pulled away from the rubber with comparative facility.

Butyl rubber comprises a copolymer containing about 85 to 99.5%, preferably 95 to 99.5% of a $C_4$ to $C_8$ isoolefin such as isobutylene, the remainder being a $C_4$ to $C_{10}$ multiolefin, preferably a $C_4$ to $C_6$ conjugated diolefin such as butadiene, dimethyl butadiene, piperylene or especially isoprene. The preparation of butyl-type rubbers is described in U.S. Patent 2,356,128 to Thomas et al. and also in other patents as well as in literature.

According to the present invention, fibrous materials such as tire cords are coated with a phenolic-aldehyde resin-containing poly-2-haloalkadiene rubber latex having about 1 to 25 weight percent and preferably about 5 to 20 weight percent rubber latex solids, about 0.1 to 5.0 weight percent, preferably about 0.4 to 3.0 weight percent of the phenolic material, preferably resorcinol, about 0.2 to 3.0 weight percent, preferably about 0.3 to 1.5 weight percent of the aldehyde, preferably formaldehyde, and about 70 to 95 weight percent, preferably about 75 to 90 weight percent water. Before coating, the phenolic-aldehyde resin-containing poly-2-haloalkadiene rubber latex is advantageously adjusted to a pH of between about 7 and 13, preferably about 8 to 11 and aged at about 40° to 150° F., preferably at about 50° to 100° F., for a time, depending upon the temperature, of about 20 minutes to 30 hours, preferably about 1 to 20 hours and the fibrous materials coated with the thus aged latex. The latex-coated fibrous materials are then dried, preferably with slight or substantial stretching depending upon the particular fiber and use contemplated for about 0.05 to 30 minutes, preferably about 0.1 to 10 minutes at about 200° to 550° F., preferably about 250° to 480° F., principally to at least partially thermoset the resin, drive off volatile materials and, if necessary, stretch the fiber under applied tension.

The resulting dried coated fibrous materials, such as tire cords, are then dipped or treated with a brominated butyl rubber-containing cement having, per 100 parts by weight of brominated butyl rubber, about 5 to 150, advantageously about 10 to 120, and preferably about 15 to 90 parts by weight, of a filler such as silica, clays, alumina, diatomaceous earth, calcium carbonate, silica-alumina, and preferably carbon black with or without the addition of conventional curatives such as sulfur, zinc oxide, derivatives of thiuram or carbamic acid, quinoid compounds, primary or polyfunctional amines, phenol-dialcohol resins of the polymethylol phenol type, benzothiazyl disulfide, mercaptobenzothiazole, mercaptoimidazoline, sulfenamides, or the like. The cement generally contains about 5 to 25 weight percent, preferably about 10 to 20 weight percent solids, in a $C_5$ to $C_{10}$ hydrocarbon such as pentane, hexane, isooctance, cyclohexane, methyl cyclohexane, benzene, toluene, naphthas, mineral spirits, etc. or a halogenated hydrocarbon such as ethylene dichloride, chloroform, carbon tetrachloride, or the like.

The treated fibrous material is then dried to remove the rubber solvent at about 150° to 300° F., preferably about 200° to 250° F. for about 0.5 to 30 minutes, preferably about 1 to 10 minutes, preferably under conditions of extended storage. However, air drying at room temperature will suffice. The dried treated fibrous materials such as tire cords are then imbedded as by calendering or the like in an unvulcanized rubber matrix such as natural rubber, butyl rubber, chlorinated butyl rubber, brominated butyl rubber, neoprene rubber, polybromoprene rubber, GR-S rubber, Buna-N rubber, rubbery vinyl pyridine-butadiene copolymers, rubbery tripolymers of butadiene-acrylonitrile-vinyl pyridine, etc. and vulcanized in situ for about 0.5 to 90 minutes at about 200° to 450° F. to produce a finished article having an improved bond between the coated fibrous material and rubber.

The above procedure produces superior articles suitable for use in constructing tire carcasses for automobiles, trucks, airplanes, etc., as well as numerous other uses such as conveyor belts, rubber hosing, air springs and other products built up of a plurality of laminations of cord and rubber, etc., the invention being especially applicable to such products which have at least one layer which is of butyl rubber. The invention may also be applied in uses involving merely a single layer of a fabric such as nylon, cotton, rayon, silk, etc., which may be either coated on one side or both sides, with the resin-containing polyhaloalkadiene rubber latex and brominated butyl rubber cements as described above.

The polyhaloalkadiene rubbers, useful for the purposes of the present invention, include among others, poly-2-haloalkadienes having about 4 to 18 carbon atoms as the monomeric unit in the polymerization chain. Poly-2-chloro-alkadienes-1,3 and poly-2-bromo-alkadienes-1,3 known in the art as polychloroprenes and polybromoprenes, respectively, are preferred. Suitable polyhaloalkadiene rubbers are described in U.S. Patents 1,950,432 to 1,950,440; U.S. 2,264,173; and U.S. 2,356,091. The most preferred polyhaloalkadiene rubbers are poly-1-alkyl-2-bromo-1,3-butadiene; poly-1-alkyl-2-chloro-1,3-butadiene; poly-2-bromo-1,3-butadiene, and especially poly-2-chloro-1,3-butadiene.

The phenolic-aldehyde resins which are within the purview of the present invention may be generally defined as belonging to the class of heat-hardening phenol-aldehyde type resins, preferably resins from phenolic compounds which, prior to heat-hardening or thermosetting are water soluble at least to the extent of 5 to 10% or more. Such resins are capable of thermally setting in the absence of any added catalysts at temperatures of about 150° to 400° F., temperatures of 200° to 250° F. being preferred for coating rayon, whereas higher temperatures are permissible for nylon.

As phenolic compounds capable of producing resins of the above-mentioned characteristics, mono- or especially polyhydroxy benzenes are satisfactory. Di-hydroxy benzenes having the hydroxyl groups meta with respect to each other are preferred. Satisfactory phenolic compounds include phenol, cresols, orcinol, phloroglucinol, xylenols, trimethyl phenols, mono- or dichloro phenols, diamyl or diisopropyl phenols, p-tertiary butyl phenol, p-phenyl-phenol, hydroquinone, and especially resorcinol.

The preferred aldehydes for reaction with the above phenolic compounds include formaldehyde or a material supplying formaldehyde such as paraformaldehyde. Other suitable aldehydes include acetaldehyde, propionaldehyde, furfural, etc. The ratio of the phenolic compound to the aldehyde is preferably such that the resin, prior to thermosetting, has substantial water solubility. In order to produce the desired resin, a small amount of an alkali metal containing catalyst or other condensing agent is preferred. If sodium hydroxide is employed, it is advantageously present in amounts of about 0.02 to 0.5 percent by weight, based on reactants.

The brominated butyl rubber is produced by reacting the unvulcanized rubber per se or dissolved in a solvent with bromine or bromine-liberating compounds so that the polymer contains at least 0.4 weight percent and preferably at least 0.5 weight percent of combined bromine but not more than about 3 atoms of bromine combined in the polymer per molecule of multiolefin present therein; i.e., not more than about 3 atoms of combined bromine per double bond in the polymer.

Suitable brominating agents which may be employed are molecular bromine, alkali metal bromites (preferably sodium hypobromite), sulfur bromides (particularly oxygenated sulfur bromines), pyridinium bromide perbromide, N-bromo-succinimide, N,N'-dibromo dimethyl hydantoin, alpha-bromoaceto acetanilide, tri-bromophenol bromide, N-bromoacetamide, beta-bromo-methyl phthalimide, and other common brominating agents. The preferred brominating agents are molecular bromine and/or those bromine compounds which are known to lead to allylic substitution, e.g., N,N'-dibromo dimethyl hydantoin, N-bromosuccinimide, beta-bromoethyl phthalimide, N-bromoacetamide, etc. The bromination is advantageously conducted at about −30° C. to +200° C., preferably at about 20° to 170° C., for about one minute to several hours. However, the temperatures and times are regulated to brominate the rubbery copolymer to the extent above-mentioned.

The bromination may be accomplished in various ways. One process comprises preparing a solution of the copolymer as above, in a suitable inert liquid organic solvent such as an inert hydrocarbon or advantageously halogenated derivatives of saturated hydrocarbons, examples of which are hexane, heptane, naphtha, kerosene, straight run mineral spirits, benzene, toluene, chlorobenzene, chloroform, trichloroethane, carbon tetrachloride, etc., and adding thereto the bromine or other brominating agent, optionally in solution, such as dissolved in an alkyl chloride, carbon tetrachloride, etc. Another variation comprises employing liquid bromine. Still a further method resides in blending with the solid copolymer a solid brominating agent which is known to lead to allylic substitution such as N,N'-dimethyl dibromo hydantoin or N-bromosuccinimide, supra. In such a case, the blend formed is preferably mill-mixed and heated to a temperature sufficient to brominate the solid copolymer. The use of elevated or depressed pressures is optional since atmospheric pressure is satisfactory. However, the pressure may vary, depending upon the foregoing temperatures and reaction times from about 1 to 400 p.s.i.a.

The invention will be better understood from the following experimental data.

EXAMPLE I

Nylon tire cords (840 denier/2 ply) were dipped at room temperature in a resin-containing neoprene rubber latex of the following formulation:

| Component: | Parts by weight |
|---|---|
| Neoprene latex [1] (36% solids) | 14.0 |
| Resorcinol | 0.4 |
| Formaldehyde (37%) | 0.6 |
| Additional water | 85 |

[1] The neoprene latex employed was type 735 consisting of poly-2-chloro-1,3-butadiene and having a specific gravity of 1.08, an initial pH of 12.2, and containing as the emulsifier the sodium salt of disproportionated rosin.

The solution containing resorcinol and formaldehyde in water was blended with the latex and the pH adjusted to 8.5 with 10% NaOH and aged for 16 hours at 75° F. The nylon cord, after dipping in the above formulation, was then dried at 250° F. for 5 minutes. This treated cord was then dipped at room temperature into brominated butyl rubber-containing cement having 15 weight percent solids wherein the brominated butyl rubber had a viscosity average molecular weight of 350,000, a mole percent unsaturation of 0.77, a Mooney viscosity (8 minutes at 212° F.) of 54, and 2.08 weight percent combined bromine. For comparison purposes, a portion of a resin-containing natural rubber latex treated cord was not dipped in the brominated butyl rubber cement before use. The solids portion of the cement had the following composition in the preparation of which the compounded stock had been milled on a rubber mill at room temperature for 15 minutes:

| Component: | Parts by weight |
|---|---|
| Polymer | 100 |
| Carbon black (MPC) | 50 |

The cords, coated as above, were then each dried for 2 minutes at 250° F. The cords were then lodged in an uncured butyl rubber matrix and vulcanized for 25 minutes 320° F.; the matrix having the following composition:

| Ingredient: | Parts by weight |
|---|---|
| Butyl rubber [1] | 100 |
| MPC carbon black | 24 |
| SRF carbon black | 16 |
| N-nitroso-p-nitroso methyl aniline | 1.0 |
| Zinc oxide | 5.0 |
| Amberol ST-137X [2] | 2.5 |
| Sulfur | 2.0 |
| Tellurium diethyl dithiocarbamate | 1.25 |
| Plasticizer hydrocarbon oil "A" [3] | 12.5 |

[1] The butyl rubber of the matrix had a viscosity average molecular weight of 336,000, a mole percent unsaturation of 1.99, and a Mooney viscosity (212° F. for 8 minutes) of 45.

[2] Non-reactive p-octyl phenol-formaldehyde resin.

[3] The plasticizer hydrocarbon oil was a paraffinic base oil having the following characteristics:

| | |
|---|---|
| Aniline point (° F.) | 215 |
| S.S.U. at 100° F | 508 |
| S.S.U. at 210° F | 58 |
| Pour point (° F.) | 30 |
| Flash point (° F.) | 365 |
| Specific gravity | 0.90 |

The adhesions of the cords, coated in accordance with the invention, to the matrix were measured by a technique essentially similar to the "H" test described by Lyons, Conrad and Nelson, Rubber Chemistry and Technology, 268, vol. XX (1947). The tire cords used were nylon tire cords of 840 denier 2 ply construction. The test specimens were prepared with a ⅜ inch length of treated cord vulcanized into the center of a 1½ x ⅜ x ⅛ inch butyl rubber matrix composition. The vulcanized rubber matrix was reinforced with light cotton duck on the two long sides from which the cord did not protrude. The force required to pull the ⅜ inch length of cord from the rubber block was measured by means of a Scott tensile tester at a 10 inches per minute jaw separation rate at 75° F. The results were as follows:

"H" Test Adhesion Results (ADHESION IN POUNDS AT ROOM TEMPERATURE)

Brominated butyl cement _____ 19.4
No cement _____ 6.5

The above data indicates that superior adhesion is obtained when employing the brominated butyl rubber cement in conjunction with a resorcinol-formaldehyde resin-containing neoprene rubber latex in accordance with the present invention.

EXAMPLE II

The same general procedure as in Example I was repeated substituting for the neoprene rubber latex the following:

| Component: | Parts by weight |
|---|---|
| Neoprene latex type 735 (36% solids) | 43 |
| Resorcinol | 1.1 |
| Formaldehyde (37%) | 1.8 |
| Additional water | 54.1 |

Upon coating the cords with the aged resin-containing neoprene latex, drying and coating with the brominated butyl rubber cement as in Example I, the following "H" test adhesion results were obtained:

(ADHESION IN POUNDS AT ROOM TEMPERATURE)

Brominated butyl cement _____ 19.5
No cement _____ 7.0

The same general comments apply to the results of this data as in Example I.

One particularly advantageous use for the adhesion combinations of the present invention is pneumatic tires of either the inner tube containing variety or in tubeless type tires.

Refering now to the drawings, the figure depicts a pneumatic tubeless tire which comprises a hollow toroidal type member which is substantially U-shaped in cross-section by virtue of an open portion which extends around the inner periphery of the member. In other words, the tire is of a tubeless type structure which has a cross-section in the form of an open-bellied body with spaced terminal portions to define a member generally resembling a horseshoe. The terminal portions contitute the bead portions 11—11 of the tire inside of which are a plurality of bead wires adhesively imbedded and molded in a rubber. The outer surface of the bead portion is advantageously formed into an air-sealing means to aid in adhesion to rim 12 when the tire is inflated. Typical air sealing means may comprise a layer of rubber disposed on the outer surfaces of the bead portions. This layer will generally vary in thickness between about 0.02 to 0.5 inch and comprise a vulcanized rubber or rubbers having a relatively low compression or permanent set. Alternatively, the outer surfaces of the bead portions may contain a plurality of ribs or, if these surfaces are smooth, the tire rim may be roughened (for example by sandblasting) and/or ribbed circumferentially or both circumferentially and radially in those areas where the outer surfaces of the tire bead portions contact the rim.

In any of the foregoing types of sealing means, a gumbo, dope, or cement comprising a soft, tacky, rubbery composition may be applied to the outer surfaces of the bead portions and/or the tire rim prior to mounting the tire. The particular structural details of the tire or rim surfaces do not constitute a part of the present invention. The outer surface of the tire also includes tread area 13 and sidewalls 14. The open portion of the horseshoe-shaped tire faces that portion of the inner circumference of the tire which is adjacent the said tread area 13 of the tire.

The remaining construction of the tire may vary according to conventional fabrication, but in general the tire is a multi-layered type of structure with an outer layer as above-mentioned. The layer next adjacent the outer layer generally comprises a carcass 15 which includes a rubber which has incorporated therein a fabric composed of a plurality of cotton, rayon, steel or nylon cords, etc. in the manner hereinbefore described, in accordance with the present invention. The tire also includes an inner lining 16 and/or a tie-ply advantageously made from rubber, e.g., natural rubber, chlorinated butyl rubber (containing at least 0.5 weight percent combined chlorine but not more than 1 atom of chlorine per double bond in the rubber), brominated butyl rubber, unmodified butyl rubber, or natural rubber, vulcanized for about 1 to 60 minutes at about 200° to 450° F. This inner lining must be substantially impermeable to air. The above multi-layers, at least three in number, are conventionally bonded or otherwise adhered together, for example, by cementing and/or especially by vulcanizing to form a tire of a unitary structure.

The expression "layer" as employed in the claims is intended to include plies and liners, as well as such layers as the carcass, sidewalls, tread area, etc., of tires.

Resort may be had to various modifications and variations of the present invention without departing from the spirit of the invention or the scope of the appended claims.

What is claimed is:

1. A process for improving the surface adhesion of a fibrous material which comprises coating said material with a phenolic-aldehyde resin-containing polyhaloalkadiene rubber latex containing about 1 to 25% latex solids, about 0.1–5.0% of phenolic material and about 0.2 to 3.0% of aldehyde, adjusted to a pH of about 7 to 13, drying, and then with a brominated butyl rubber cement, said brominated butyl rubber being a butyl rubber modified with a brominating agent to contain sufficient amounts of at least 0.4% of bromine to improve its adhesive characteristics but not more than about 3 combined atoms of bromine per double bond in the butyl rubber polymer, said butyl rubber being a copolymer of about 85–99.5% of an isoolefin of 4 to 8 carbon atoms and the balance of a multiolefin of 4 to 6 carbon atoms.

2. A process according to claim 1 in which the phenolic-aldehyde resin is a resorcinol-fromaldehyde resin.

3. A process according to claim 1 in which 100 parts by weight of the brominated butyl rubber is in admixture with about 5 to 150 parts by weight of a filler.

4. A process according to claim 3 in which the filler is a carbon black.

5. A process according to claim 1 in which the rubber in said latex consists of polychloroalkadiene rubber.

6. A process according to claim 5 in which the fibrous material is a synthetic rayon tire cord.

7. A process according to claim 5 in which the phenolic-aldehyde resin is a resorcinol-formaldehyde condensation product.

8. A process according to claim 5 in which the fibrous material is nylon.

9. A process according to claim 5 in which the brominated butyl rubber formed has been compounded with about 5 to 150 parts by weight of a powdered filler per 100 parts by weight of brominated butyl rubber, the rubber in the latex being a poly 2-chlorobutadiene rubber.

10. A process according to claim 5 in which the brominated butyl rubber is dissolved in a volatile solvent.

11. A fibrous material coated with a first layer of a phenolic-aldehyde resin-containing polyhaloalkadiene rubber latex containing about 1 to 25% latex solids, about 0.1–5.0% of phenolic material and about 0.2 to 3.0% of aldehyde, having a pH of about 7 to 13, dried and then coated with a second layer of a brominated butyl rubber modified by a brominating agent to contain sufficient amounts of at least about 0.4% of bromine to improve its adhesion characteristics but not more than about 3 combined atoms of bromine per double bond in said butyl rubber, said butyl rubber being a copolymer of about 85–99.5% of an isoolefin of 4 to 8 carbon atoms and the balance of a multiolefin of 4 to 6 carbon items.

12. A fibrous material according to claim 11 coated with a first layer of a resorcinol-formaldehyde resin-containing polychloroalkadiene rubber latex.

13. A laminated structure comprising a fibrous material, said fibrous material being coated with a first layer of a resorcinol-formaldehyde resin-containing polyhaloalkadiene rubber latex containing about 1 to 25% latex solids, about 01.–5.0% of phenolic material and about 0.2 to 3.0% of aldehyde, having a pH of about 7 to 13, dried and then coated with a second layer of a cement of a butyl rubber modified with a brominating agent to contain at least about 0.5 weight percent bromine but not more than about three combined atoms of bromine per double bond in the polymer and at least one layer of rubber adhesively united to the resultant coated-fibrous material, said butyl rubber being a copolymer of about 85–99.5% of an isoolefin of 4 to 8 carbon atoms and the balance of a multiolefin of 4 to 6 carbon atoms.

14. A laminated structure according to claim 13 comprising at least two rubber layers and at least one interposed layer of fibrous material.

15. A laminated structure according to claim 13 of a hollow toroidal form adapted to retain therein a fluid.

16. A rubber tire which contains in the carcass layer thereof a plurality of cords imbedded in a rubber, said cords having been coated with a phenolic-aldehyde resin-containing polyhaloalkadiene rubber latex containing about 1 to 25% latex solids, about 0.1–5.0% of phenolic material and about 0.2 to 3.0% of aldehyde, having a pH of about 7 to 13, dried and then coated with a second layer of a cement of butyl rubber which has been modified with a brominating agent to contain sufficient amounts of at least 0.4% of bromine to improve the adhesion of said cords to the rubber in which they are imbedded but not more than about 3 combined atoms of bromine per double bond in the butyl rubber, said butyl rubber being a copolymer of about 85–99.5% of an isoolefin of 4 to 8 carbon atoms and the balance of a multiolefin of 4 to 6 carbon atoms.

17. In a tubeless tire the combination which comprises an inner layer of a member selected from the group consisting of natural rubber, butyl rubber, and brominated butyl rubber; an outer layer including an open-bellied body comprising two opposing side walls, spaced bead portions and a median tread area; and an intermediate layer defining a carcass including a rubber and a plurality of cords imbedded therein, wherein said cords have been first coated with a phenolic-aldehyde resin-containing polychloroalkadiene rubber latex containing about 1 to 25% latex solids, about 0.1–5.0% of phenolic material and about 0.2 to 3.0% of aldehyde, having a pH of about 7 to 13, dried and then coated with a cement of butyl rubber modified by bromination to contain sufficient amounts of at least 0.5% of bromine to improve the adhesion of said cords to the rubber in which they are imbedded, but not more than about 3 combined atoms of bromine per double bond in the butyl rubber polymer, said butyl rubber being a copolymer of about 85–99.5% of an isoolefin of 4 to 8 carbon atoms and the balance of a multiolefin of 4 to 6 carbon atoms.

18. A tire in accordance with claim 17 in which the rubber in the carcass is selected from the group consisting of natural rubber, rubbery isoolefin-multiolefin copolymers, chlorinated rubbery isoolefin-multiolefin copolymers, brominated rubbery isoolefin-multiolefin copolymers, polychloro-butadiene rubber, rubbery diene-styrene copolymers, rubbery diene-nitrile copolymers, rubbery vinyl pyridine-butadiene copolymers and rubbery tri-polymers of butadiene, acrylonitrile and vinyl pyridine.

19. A tire in accordance with claim 17 in which the rubber in the carcass consists of rubbery isoolefin-multiolefin copolymers, and the polychloroalkadiene rubber is a poly-2-chloro-1,3 butadiene rubber.

20. Laminated structure according to claim 13 in which the rubber layer to which the fibrous material is adhered consists of butyl rubber.

References Cited in the file of this patent

UNITED STATES PATENTS

| | | |
|---|---|---|
| 2,128,635 | Charch et al. | Aug. 30, 1938 |
| 2,631,984 | Crawford | Mar. 17, 1953 |
| 2,652,353 | Wilson | Sept. 15, 1953 |
| 2,653,891 | Gentle et al. | Sept. 29, 1953 |
| 2,698,042 | Perkins | Dec. 28, 1954 |
| 2,713,884 | Schwartz | July 26, 1955 |
| 2,720,479 | Crawford et al. | Oct. 11, 1955 |
| 2,822,311 | Rowe et al. | Feb. 4, 1958 |